Oct. 29, 1963 R. G. ANSCHUTZ 3,108,699
UNIDIRECTIONAL FEED AND CHUCKING APPARATUS FOR
TRANSFERRING AND CHUCKING ELONGATED
ARTICLES FOR MACHINING
Filed Jan. 5, 1961 5 Sheets-Sheet 2

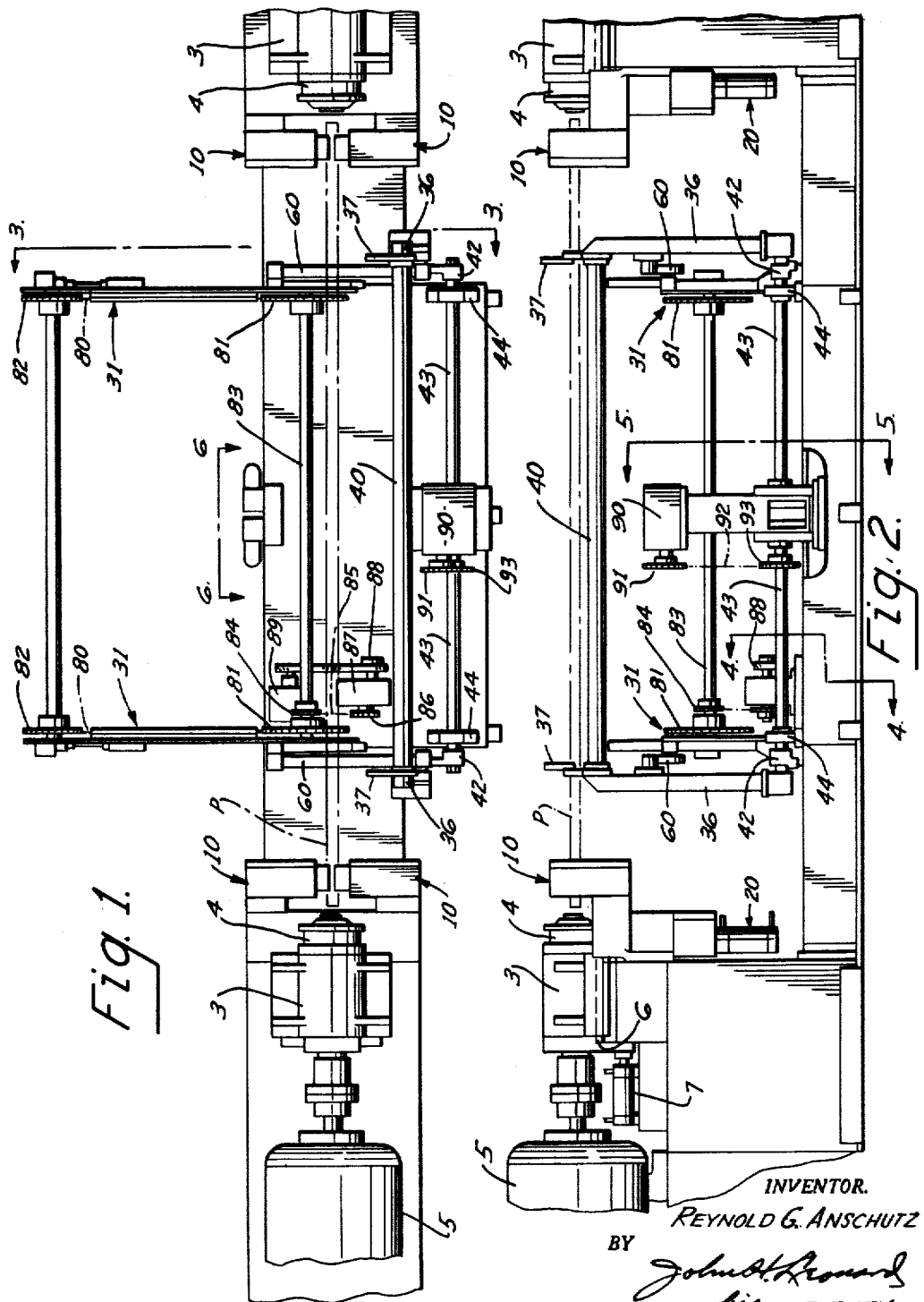

INVENTOR.
REYNOLD G. ANSCHUTZ
BY
ATTORNEY

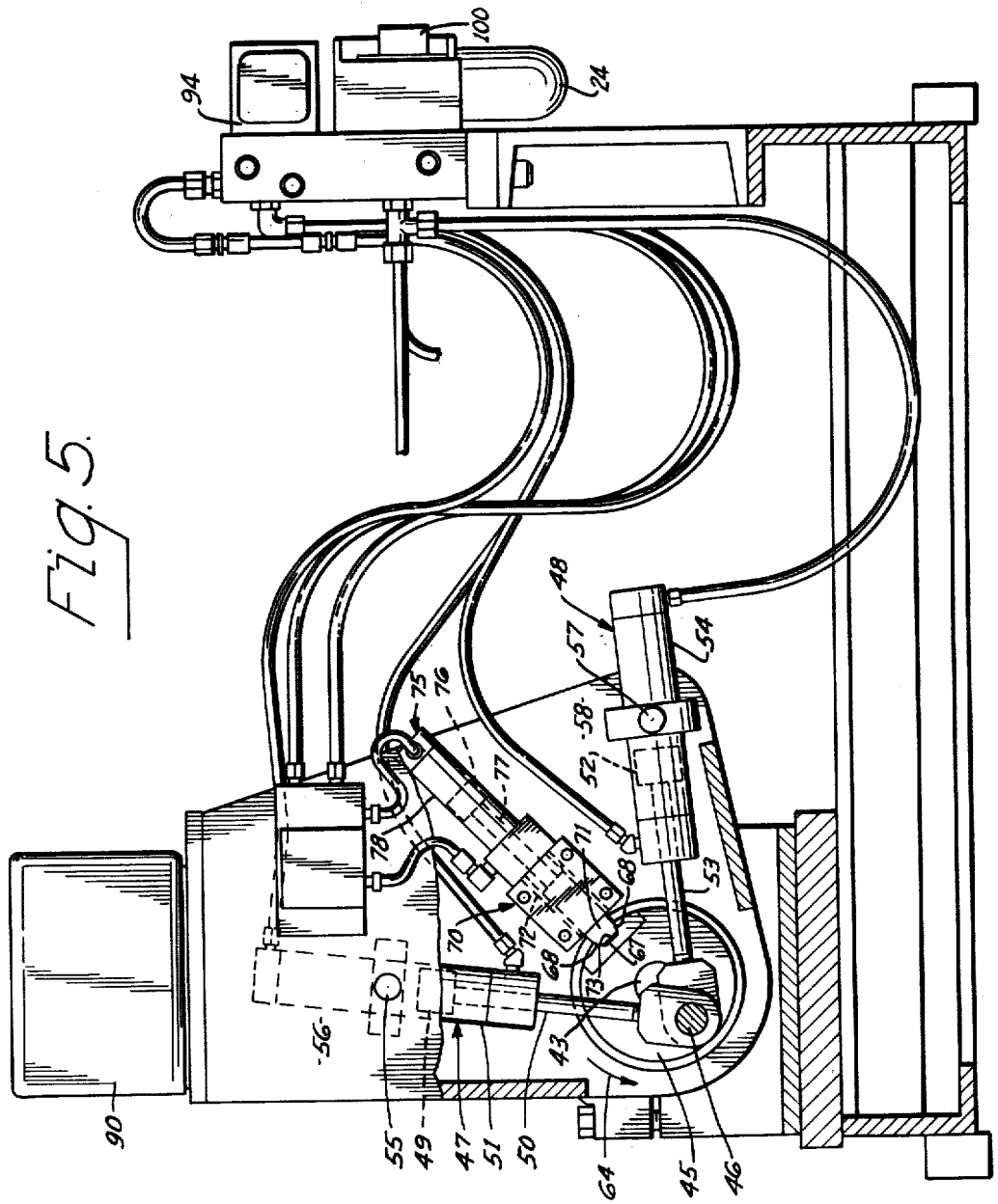

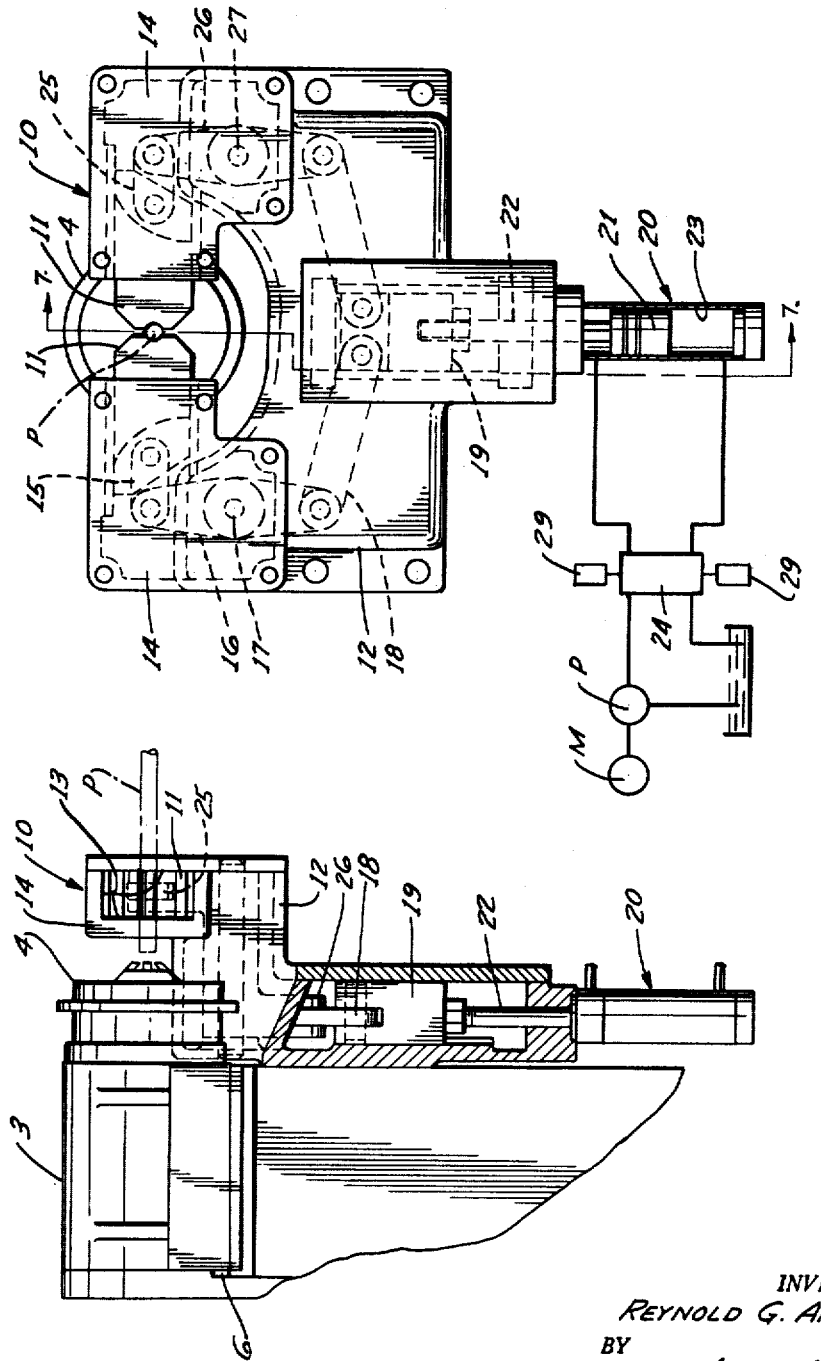

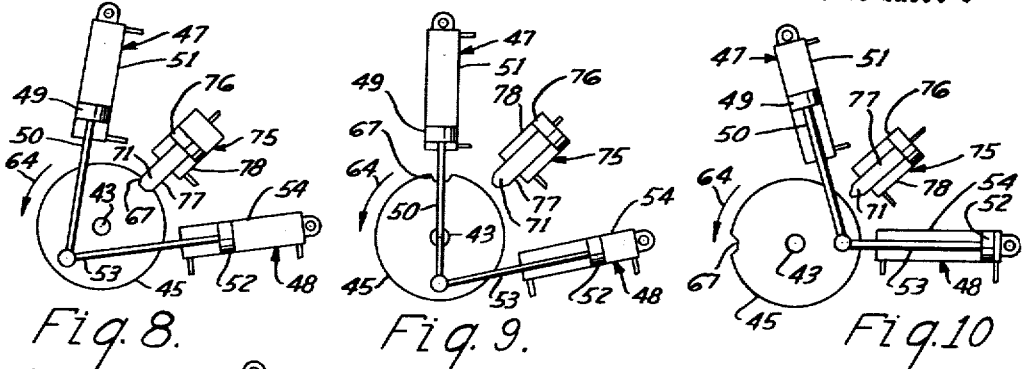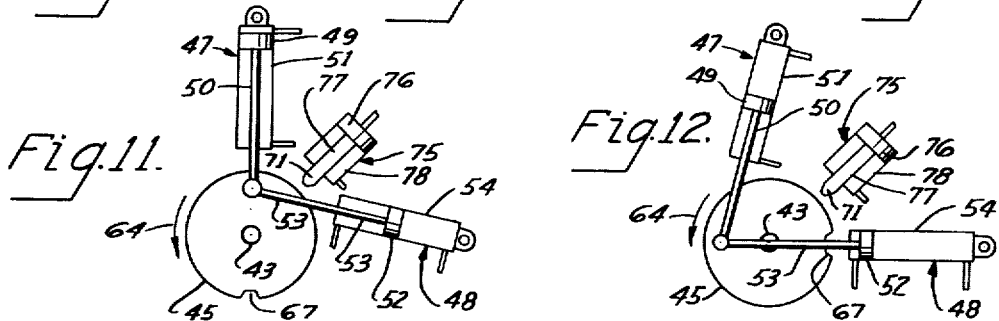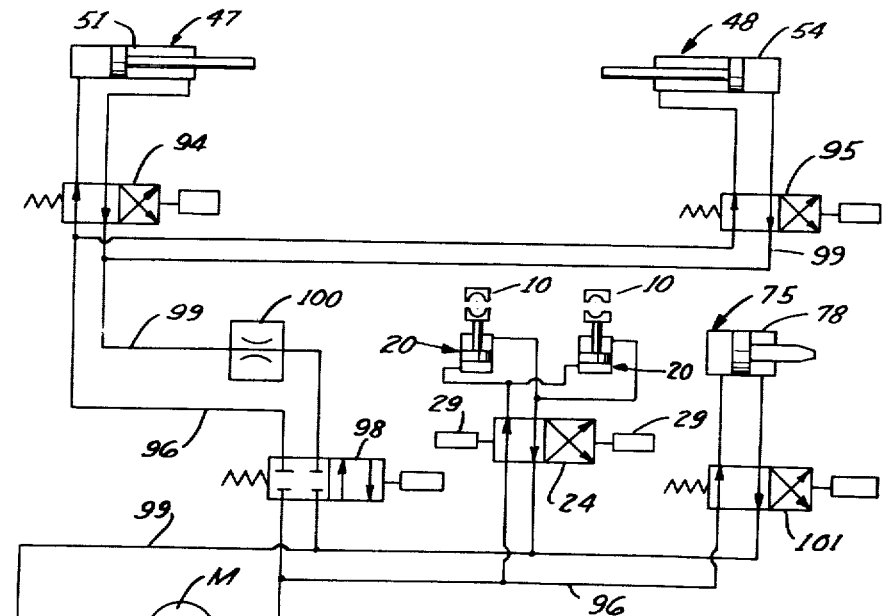

United States Patent Office 3,108,699
Patented Oct. 29, 1963

3,108,699
UNIDIRECTIONAL FEED AND CHUCKING APPARATUS FOR TRANSFERRING AND CHUCKING ELONGATED ARTICLES FOR MACHINING
Reynold G. Anschutz, Willoughby, Ohio, assignor to The Pipe Machinery Company, Wickliffe, Ohio, a corporation of Ohio
Filed Jan. 5, 1961, Ser. No. 80,918
2 Claims. (Cl. 214—1)

This invention relates to a unidirectional feed and chucking apparatus for transferring and chucking elongated articles such as pipes, rods, and the like, for machining.

For the purposes of illustration, the apparatus will be described as used in connection with a machine for threading the ends of pipe, its use in connection with other machining operations on pipes and other elongated objects being apparent from the illustrative example.

Heretofore in the machining of the ends of pipes, the general practice has been to support the pipes on a suitable feed skid on which they are disposed with their axes parallel and horizontal. Suitable stops are provided on the skid to position the pipes transversely of their lengths successively into a starting position. A transfer rack which orbits in an upright closed path lifts each pipe successively from this position and transfers it transversely of its length to suitable rolls. The rolls move each pipe endwise to a predetermined position relative to the first machine which is to thread it. At the next orbit of the transfer rack, the axially prepositioned pipe is lifted from the positioning rolls and then moved laterally and lowered into chucking position, in suitable chucks. The chucks are open at the top to receive the pipe. They grip the pipe and hold it while the spindle of the machine is moved axially of the pipe for performing the threading operation.

Upon the third orbit of the transfer rack, the chucks are released and the rack lifts the pipe out of the top of the chuck and transfers it to another set of positioning rolls which position it for threading at the opposite end. Upon the fourth orbit, the pipe is lifted from the latter positioning rolls and lowered into open top chucks for holding it while machining the other end. By a fifth orbit, the transfer rack lifts the pipe from the latter chucks and lowers it onto a discharge skid.

A prior transfer mechanism of the general type above referred to is disclosed in United States Letters Patent No. 2,728,327, issued on December 25, 1955 to W. L. Benninghoff et al., as inventors. According to the prior practice, each length of pipe is lowered into chucks, machined while held therein, then moved in the opposite direction to lift it from the chucks.

In accordance with the present invention, each length of pipe is fed transversely of its axis to, into, through, and out of, the chucks, and to the next work station, unidirectionally, and thus travels unidirectionally throughout the entire sequence of operations.

More specifically, in the present invention, the pipe is removed from a skid and fed laterally of the pipe between jaws of suitable chucks from one side of the chucks. Therein, it is gripped and held while machining operations are performed on opposite ends. After the machining operations, the chuck jaws are opened and the pipe continues through the chucks in the same direction in which it is entered, as the chuck permits the pipe to discharge from the opposite side from which it entered. Thereupon the pipe is conveyed transversely of its axis to a suitable discharge skid from which it may be discharged to a collection rack or onto a feed skid for another machining stand for further machining operations.

This unidirectional travel of the pipe may be either vertical with respect to a chuck which is open at the top and bottom, or generally horizontal with respect to a chuck which is open from one side to the other. In both cases, there is a straight diametral through passage when the jaws are open so that the pipe can travel unidirectionally throughout the entire operation.

For the purposes of illustration, the invention is shown specifically in connection with a single machining stand, but it has advantages in case of multiple stands arranged side by side wherein, after the pipe is machined in one stand and discharges, it is conveyed to the feed skid of the next adjacent stand for the next machining operation. The exact nature of the particular machining operation is relatively unimportant, and any number of machining operations with successive transfers may be performed on opposite ends of the pipe concurrently.

Various specific objects and advantages of the invention, in addition to the unidirectional transfer and movement of the pipe will become apparent from the following description wherein reference is made to the drawings, in which:

FIG. 1 is a top plan view of a machining stand and transfer rack embodying the principles of the present invention;

FIG. 2 is a front elevation of the stand and rack illustrated in FIG. 1;

Figure 4:
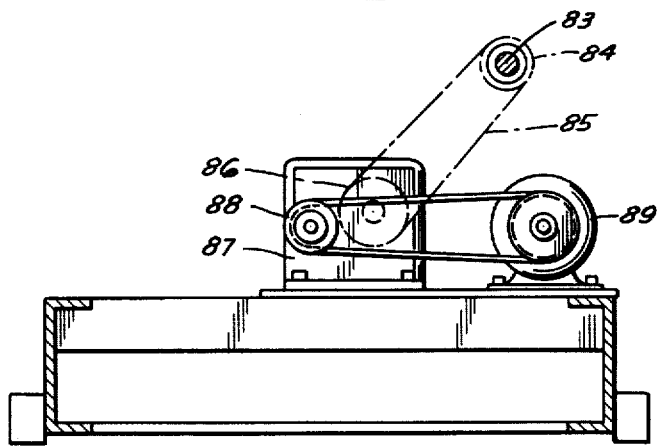

FIGS. 4 and 5 are vertical cross sectional views taken on the lines 4—4 and 5—5, respectively, of FIG. 2;

FIGS. 6 and 7 are an enlarged front elevation and a right end elevation, respectively, of one of the straight through holding chucks used in the present invention, parts thereof being shown in section;

FIGS. 8 through 12 are diagrammatic illustrations showing the cycles of operation of the transfer structure of the invention;

FIG. 13 is a schematic hydraulic circuit for control of the structure;

Referring to FIGS. 1 through 5, the embodiment of the invention there shown is in connection with the threading of opposite ends of a length of pipe.

Lengths of pipe P are supported on a suitable feed skid 1 with their axes horizontal. The skid 1 is inclined downwardly toward the machining stand so that the pipes may roll down the skid against a suitable positioning stop 2. The pipe which is adjacent the stop 2 is selected and removed from the skid by the transfer mechanism at each cycle of operation.

In the form illustrated, the machining stand comprises a pair of duplicate threading machines 3 having die heads 4, respectively, arranged in coaxial relation to each other in positions for engaging opposite ends of the pipe concurrently. Each spindle is rotatably driven by a suitable motor 5, is mounted on a slide 6 for movement axially of the pipe to threading and idle positions, and is moved along its slide by a suitable power means 7. The specific nature of the machines forms no part of the present invention.

The pipe P is held in coaxial alignment with the die heads 4 by suitable chucks during machining.

Referring specifically to the transfer and chucking apparatus, the apparatus includes a pair of stationary gripping chucks 10, illustrated in detail in FIGS. 6 and 7, arranged one near each end of the pipe. The chucks 10 are positioned for gripping the pipe near its opposite ends with the adjacent end portions protruding therebeyond in the outboard direction for cooperation with the die heads 4.

Each of the chucks 10 comprises a pair of separable jaws 11 which, when separated, permit the passage of pipe, transversely or radially of the pipe axis, both into the chuck in position for gripping by the jaws and out of the jaws when the pipe is released by the jaws. Thus the pipe can enter the chucks at one side and pass thereinto from that side and be gripped, and then released and discharged at the opposite side.

Since the chucks 10 are the same in form and function, being merely oppositely positioned, one only will be described in detail.

Referring to FIGS. 6 and 7, each chuck 10 comprises a supporting frame 12 which is mounted in fixed position on a foundation or support. Jaws 11 are suitably mounted on the frame for moving relatively toward each other laterally or horizontally. For supporting the jaws for movement in this manner, each jaw is mounted in a suitable slideway 13 provided by a portion of the frame 12 and a housing 14 secured fixedly to the frame 12.

For operating the jaws and providing adequate gripping pressure, a link 15 is pivotally connected to one of the jaws, the link 15, in turn, being pivotally connected to one end of a rocker arm 16. The rocker arm 16 is pivotally mounted in the frame 12 and housing 14 by a pivot 17. The opposite end of the rocker arm 16 is pivotally connected to a link 18 which, in turn, is pivotally connected to a slide 19. This linkage is so arranged that when the slide is moved toward the jaws, or upwardly in FIG. 8, the jaws 11 are moved to closed position. The slide 19 is connected to a piston and cylinder assemblage 20 having a piston 21 with a piston rod 22 which is connected to the slide 19. The piston is reciprocable in a cylinder 23 into which fluid pressure may be admitted at opposite ends, selectively, from a suitable source through a suitable control valve 24, as indicated.

For moving the other jaw 11 in timed relation to the first jaw 11, a suitable link 25 is pivotally connected to the other jaw 11 and, in turn, is pivotally connected to one end of a rocker 26. The rocker 26 is pivoted to the frame and housing by a pivot 27. The other end of the rocker 26 is pivotally connected to a link 28 which, in turn, is pivotally connected at its opposite end to the slide 19.

Thus upon admission of pressure fluid to the head end of the cylinder 23, the jaws are moved to closed position. Upon admission of fluid to the rod end, they are retracted from closed position. The valve 24 is controlled remotely by solenoids 29 which, in turn, preferably are controlled by suitable cam controlled circuits, as will later be explained.

It is to be noted that the jaws 11 and their supporting structure are arranged, as best illustrated in FIGS. 7 and 8, so that the pipe can enter the chuck from the top, be lowered into gripping position between the jaws and there gripped, and, when released by the jaws, can fall freely clear of all parts of the chuck downwardly to a suitable discharge skid 30. For this purpose, portions of the chuck, from the adjacent outboard end of the pipe toward the opposite end, are spaced apart horizontally on opposite sides of a vertical plane through the pipe axis distances such that they do not obstruct the downward path of the pipe into and out of the jaws. The skid 30 slopes downwardly and laterally away from the machining stand in a direction away from the skid 1.

Thus, the pipes are fed from the skid 1 to a machining position between the jaws 11 and there clamped and machined. Upon release, they drop on the skid 30 and roll outwardly away from the machining stand to a position to be picked up by a conveyor, indicated generally at 31, for conveying them to a pile assembling stand or to the feed skid of a succeeding machining stand.

For transferring the pipes from behind the stop 2 on the support 1 into position in the chucks 10, a transfer mechanism is provided. This mechanism comprises an orbital carrier 35 having a pair of arms 36 spaced apart endwise of the pipe and disposed one adjacent each chuck 10. Each of the arms 36 is provided at its upper end with a pipe engaging means 37 which have fingers 38 and 39. The fingers are so arranged that, as the arms 36 orbit, one finger of each arm will select and engage the racked pipe which is adjacent the stop 2, lift it over the stop, and retain it on the upper end of the arms 36 by means of the fingers 38 and 39. The arms 36 are rigidly connected for movement together by a suitable connecting beam in the form of a pipe 40.

Each arm 36 is pivotally connected at its lower end by a pivot 41 to a crank arm 42 of a crank shaft 43. The shaft 43 of each arm is mounted in suitable bearings 44 in fixed position on the frame of the machine. At its opposite end, each shaft 43 is provided with a suitable fly wheel 45 having a crank arm 46. The crank arms 46 are connected together with the pivots 41 in coaxial relation. Piston and cylinder assemblages 47 and 48 are connected to the crank arms 46, respectively. The assemblage 47 comprises a piston 49 having a rod 50 and being reciprocable in a cylinder 51. The assemblage 48 comprises a piston 52 having a rod 53 and being reciprocable in a cylinder 54. The cylinder 51 is pivotally connected by a trunnion 55 to a rigid supporting portion 56 of the frame of the transfer mechanism. The cylinder 54 is connected by a trunnion 57 to a rigid supporting portion 58 of the frame. The cylinders have their axes offset circumferentially of the shaft 43 and are operable in timed relation to effect successive unidirectional one-revolution cycles of the shaft 43, as will later be explained.

Rotation of the shaft 43 first lifts and then lowers the lower end of the arm 36. In order to constrain the upper end of the arm 36, and hence the pipe engaging means 37 to the proper orbital path, a guide link 60 is pivotally connected by a pivot 61 to the arm 36 at a location between its pipe engaging means 37 and its pivotal connection with the crank 42. The other end of the link 60 is pivotally connected by a pivot 62 to an upright portion 63 on the frame.

Upon rotation of the crank shaft 43, in the direction indicated by the arrow 64, the upper end or pipe engaging means of the arm 36 orbits upwardly so that its finger 38 selects the pipe against the stop 2, and lifts it from behind the stop so that it rolls into position between the fingers 38 and 39. Thereupon, the pipe is lifted to a level above the level of the chuck 10 and concurrently is moved laterally until it is above the center line of the chuck. Upon the continued rotation of the crank shaft 43, the pipe is lowered generally vertically so that it enters the chuck from above and passes downwardly to a position for gripping by the jaws. When the pipe is lowered to this position, a suitable timing mechanism is operated to cause the jaws 11 to grip the pipe, whereupon the pipe engaging means 37 continues to move downwardly and thence laterally in the reverse direction from the pipe feeding direction so as to be out of the path of the pipe when the pipe is released. This orbital path is indicated by the dot and dash line 65 in FIG. 3.

While gripped by the chucks, the pipe is machined in the first stand and the jaws 11 then are released. By the time the machining operation is finished, the pipe engaging means 37 has moved out from beneath the chuck 10, whereupon, when the jaws 11 are released, the pipe drops downwardly out of the chuck onto the skid 30. It then rolls down the skid 30 away from the chuck and machining stand to the conveyor 31.

In order to center the feeding means 37 so that it centers the pipe precisely at the axis of the chuck and machines, one of the fly wheels 45 is provided with a radial socket 67 having sloping side walls 68 which diverge radially outwardly of the fly wheel. Mounted on the frame of the machine is a centering device 70 which comprises a centering pin 71 mounted in a suitable slideway 72 for reciprocation radially of the axis of the crank shaft 43 and fly wheel 45. The pin 71 has outer end portions, indicated at 73, which has sloping side walls which slope at essentially the same angle as the wall portions 68 of the notch 67. By forcing the pin radially inwardly into the socket, complementary sloping walls of the pin engage those of the socket and cam the fly wheel so that it rotates about its axis in the proper direction the few degrees necessary to bring the pipe feeding means 37 into the position in which the pipe is precisely coaxial with the chuck and die heads.

In order to operate the pin 73, a piston and cylinder assemblage 75 is provided, this assemblage comprising a piston 76 having a rod 77 directed radially of the shaft 43 and parallel to the pin 71, and connected at its outer end to the pin 71. The piston is reciprocable in a cylinder 78 which is reversible by a suitable valve means, as will later be described, so that when the piston is extended, the pin 71 engages the socket of the fly wheel.

The conveyor 31 may be of any suitable type and preferably is a pair of endless chains arranged one near each end of the transfer rack. In the form illustrated, two such chains are utilized. Since they are the same in form and function, one only will be described.

Each conveyor portion comprises an endless chain 80 mounted on a driving sprocket 81 and an idler sprocket 82. The driving sprockets 81 are mounted on a common drive shaft 83 which carries a sprocket 84. The sprocket 84 is connected by a driving chain 85 to a suitable sprocket 86 which is driven through a reduction gearing 87 by a suitable pulley 88 which, in turn, is driven by a motor 89.

The timing of the device, as will be more fully explained hereinafter, is controlled by a suitable drum-type master switch 90 which is driven by a sprocket 91. The sprocket 91 is connected by a chain 92 to a sprocket 93 which is on and rotatable with the main drive shaft 43. The conveyor 31 may convey the pipe from the discharge skid 30 and discharge it at a piling station or onto a suitable feed skid, such as skid 1 of another machining stand if the pipe is to have additional machining operations performed thereon.

Figure 3:
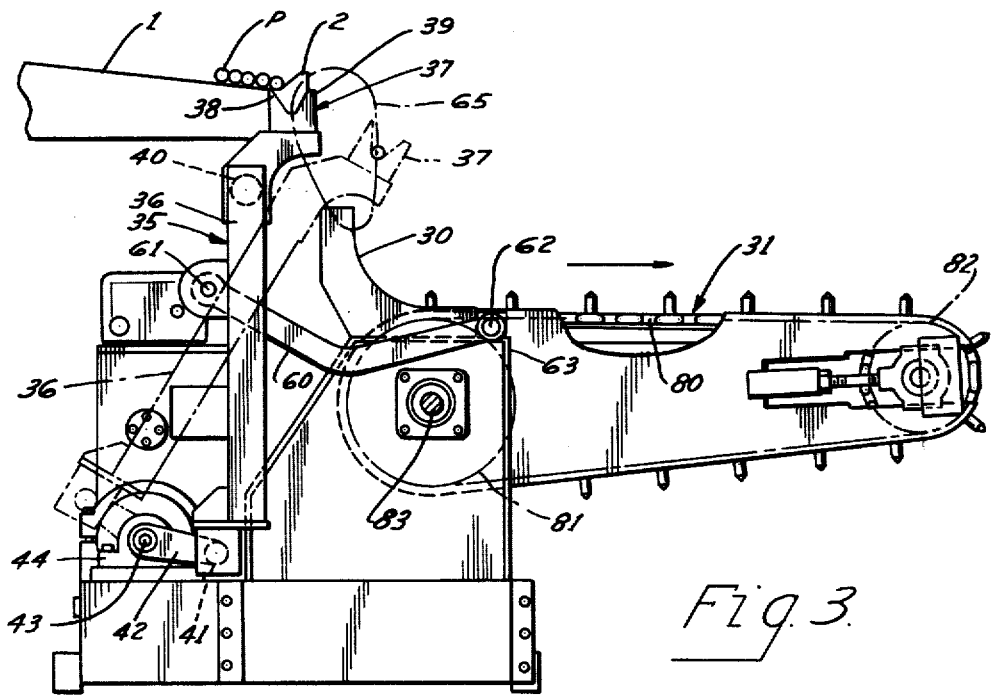
FIG. 3 is a right end elevation of the structure illustrated in FIG. 1, and is taken on the line 3—3 in FIG. 1, the right hand chuck and machine being omitted.

Referring next to FIGS. 8 through 12, the cycle of operation is illustrated. Referring first to FIG. 3 and FIG. 9, FIG 9 shows the position 1 in which the mechanism is at rest with the pipe held at the center line of the chuck, as indicated by the dot-dash outline of the arm 36 in FIG. 3. The chuck is not yet closed and the centering pin is seated in the socket 67 of the fly wheel 45. The various parts reach the position illustrated in FIG. 9 with the cylinder assemblages 47 and 48 opposed to each other, as a result of pressure at the head end of both cylinders 51 and 54. They arrived at this position with pressure at these ends of the cylinders but with the assemblage 47 having the torque advantage before this position was reached due to its line of thrust being farther out from the axis of rotation. The advantages of this type of operation are that the mechanism automatically slows down or buffers itself as it approaches the final position and, theoretically, as soon as the line of thrust of both piston rods 50 and 53 are exactly the same distance from the axis of rotation of the shaft 43, the assemblages which employ the same size pistons and cylinders are held hydraulically in balance and thus find the proper position. However, since cylinders do not operate at all times exactly alike due to frictional forces and the like, the pin 71 is provided to assure the proper centering. The assemblages 47 and 48 come to rest so close to the final position that the pin can always engage the socket and complete the centering operation.

Starting from position 1, the machine or mechanism signals that the chucks 10 are closed and upon receiving this signal the centering pin is disengaged. Pressure on cylinder 54 is reversed so that it is placed at the rod end. Thus both pistons 49 and 52 are operating to rotate the shaft 43 in the same direction, as indicated by the arrow 64. This starts the rotation.

FIG. 9 shows the succeeding position. As there shown, pressure is reversed from the head end to the rod end of the assemblage 37 of the cylinder 51 so that both of the assemblages 47 and 48 continue to drive the crank shaft in the same direction.

Upon continued rotation, the position in FIG. 10 is reached. In this position, the pressure is changed from the rod end to the head end of the cylinder 54, the pressure in the cylinder 51 remaining at the rod end. Thus both cylinders are continuing the rotation of the shaft 43 in the same direction.

Upon continuing rotation, the position illustrated in FIG. 11 is reached. When this position is reached, the piston 49 has reached the end of its stroke in cylinder 51 and pressure is then changed from the rod end to the head end of the cylinder 51. The pressure in cylinder 54 remains at the head end. Thus both pistons are continuing the rotation.

Upon continuing the rotation, the position in FIG. 12 is reached and in anticipation of stopping, the pressure is maintained on the head end of the cylinder 51 and on the head end of the cylinder 54. In this condition, the cylinder 51 is providing the main torque or turning moment. It is opposed by the cylinder 54. As rotation continues in the same direction, the opposing torque moment from the cylinder 54 increases while the moment from the cylinder 51 decreases so that a balance is reached and rotation stops with the socket 67 very close to alignment with the centering pin 71.

Just before this position is reached, the signal is given which causes a supply of pressure fluid to the head end of the cylinder 78 of the assemblage 75, which drives the pin 73 toward and into the socket. Thus, a complete cycle of operation is carried through.

The specific means for timing the cycle may be conventional. Preferably it is done by the drum-type control master switch 90 plus conventional limit switches. For the purpose of control, the valve for controlling the cylinders are solenoid operated as are all other valves used herein.

Let it be assumed that a pipe has been moved to position for machining and the jaws have been closed. In this condition, the transfer mechanism is at rest. If desired, a limit switch or manually operated switch may be provided for starting the machines upon jaw closure, for releasing the centering pin, and for reversing the valves supplying the cylinders 51 and 54, so that the pressure is reversed in the cylinder 54 and starts the cycle of rotation of the shaft 43. The jaws remain closed and the machine operation is continued as the transfer mechanism continues on its cycle and first lifts the pipe from the skid and starts moving it toward the position for deposit in the chucks. As soon as the machines have completed their machining operations, which is before the arrival of a successive pipe into position for chucking, the jaws open, as a result of the signal received from the drum. The machined pipe drops through the chuck. As soon as the second successive pipe is in position, the drum switch causes the centering pin to engage in its socket and center the pipe and the jaws to close. The closure of the jaws again causes a limit switch to start the next transfer cycle.

As best illustrated in FIG. 13, for operating the cylinders 51 and 54 and reversing them in the proper sequence in response to the master switch or drum, cylinder 51 is supplied through a valve 94 and the cylinder 54 is supplied through a valve 95. Each of these valves is solenoid operated with a spring return. The two cylinders are each individually connected to their respective valves and the valves are connected in parallel to the source, indicated by a motor driven pump M. The discharge side of the pump is connected to a line 96 and the intake side is connected by a line 97 to a sump S. The line 96 leads to a solenoid operated spring return valve which, when the solenoid is deenergized, locks all ports and which is used for emergency stops. The line 96 continues beyond the valve 98 to the valves 94 and 95. A return line 99 is connected to both of the valves 94 and 95 and to the valve 98 through a suitable flow control valve 100.

The cylinder 78 is connected by a reversing valve 101 to the pressure line 96 and return line 99. The control of the machines is conventional. The drum type master switch may be of the ordinary type employing a series of cams for effecting the operations, respectively. Each cam is connected drivingly to an electrical contact for opening and closing the contact for operating the solenoids. The specific control mechanism forms no part of the invention and in general it may be of the type shown in the above identified patent, modified for the specific cycles desired.

The emergency stop valve 98 shuts off both the pressure and exhaust in the hydraulic system and may be operated manually or automatically in case of accident. On the other hand, if desired, the starting and stopping of the cycles may be manual.

Thus it will be seen that the feed is a unidirectional feed by which the pipe is transferred from a feed position to the chucking position, there chucked and machined, and unidirectionally passed through the chuck to a discharge position. With the apparatus described, any number of stands can be arranged in laterally spaced relation to each other and the pipe passed successively unidirectionally therethrough, being discharged from one and immediately fed into and discharged from another.

Having thus described my invention, I claim:

1. An apparatus for transferring and chucking elongated articles for machining and comprising a support for supporting an article with its axis horizontal, a pair of coaxial chucks spaced laterally from the support and axially of each other and adapted to grip and hold the article, with its axis horizontal, in position for machining, said chucks having their common axis horizontal and having laterally movable jaws which, when open, can receive the article therebetween in a downward direction radially of its axis and of the common axis from the top and discharge the article in a downward direction radially of its axis and of the common axis from the bottom, an orbiting transfer rack having an article engaging means movable about a horizontal axis in a closed orbit to lift the article from the support to a level above the chucks, move it laterally, then lower it downwardly, while supporting it with its axis horizontal, between the chuck jaws, then continue its own downward movement to a level below the jaws and out of the path of the discharged article, and then return to starting position preparatory to lifting a succeeding article from the support, means operative to close the jaws when the article is at a predetermined level therebetween, a discharge rack below the jaw level and adapted to receive the article when the jaws are released, and means timing the operation of the transfer rack so that said article engaging means is out of the path of the falling article released by the jaws.

2. A unidirectional feed and chucking apparatus for transferring and chucking elongated articles for machining and comprising a support for supporting an elongated article with its axis horizontal, a pair of coaxial chucks spaced laterally from the support and axially from each other, with their common axis horizontal, and adapted to receive and grip opposite end portions of an elongated article near the ends of the article, respectively, and to support the gripped article with its axis horizontal, said chucks having jaws movable toward and away from each other and which, when open, can receive the article therebetween in a direction radially of its axis and the common axis of the chucks, while the article is horizontal, at one location circumferentially of the common axis and, upon continued movement of the article, while it is horizontal, in the same direction radially of its axis and the common axis, can discharge the article at a new location spaced circumferentially of the common axis from said one location, conveyor means for moving the article radially of the article from the support into the chucks at said one location and for supporting the article horizontally in a position between the chuck jaws for gripping by the jaws, said jaws permitting the article to continue its radially movement in the same direction out from between the jaws at said new location when the jaws are opened, power means operable to close and open the jaws of the chuck when the article is in said position therebetween, said conveyor means comprising an orbiting transfer rack having an article engaging means movable in one direction in a closed orbit about a horizontal axis to lift the article from the support and move the article radially of the axis of the article to said one location between the chuck jaws, then continue its own movement in said orbit in said direction out of the path of continued radial movement of the article as it passes from between the jaws, upon release, and then return to starting positions preparatory to lifting a succeeding article from the support, an additional power means operative when energized to move the rack through a complete orbit, and control means of the jaws for controlling the power means for causing the power means to close the jaws when the article is moved into said position and to release the jaws.

References Cited in the file of this patent
UNITED STATES PATENTS

| | | |
|---|---|---|
| 1,830,760 | Johnsen | Nov. 10, 1931 |
| 1,922,980 | Reis | Aug. 15, 1933 |
| 2,156,695 | Klein | May 2, 1939 |
| 2,728,327 | Benninghoff | Dec. 27, 1955 |
| 2,811,876 | Batchelder | Nov. 5, 1957 |
| 2,856,895 | Anderson et al. | Oct. 21, 1958 |
| 2,893,348 | Pearson | July 7, 1959 |

UNITED STATES PATENT OFFICE
CERTIFICATE OF CORRECTION

Patent No. 3,108,699            October 29, 1963

Reynold G. Anschutz

It is hereby certified that error appears in the above numbered patent requiring correction and that the said Letters Patent should read as corrected below.

Column 8, line 23, for "radially" read -- radial --; line 39, strike out "of the jaws" and insert the same after "means", first occurrence, in line 40, same column 8.

Signed and sealed this 28th day of April 1964.

(SEAL)
Attest:
ERNEST W. SWIDER

Attesting Officer

EDWARD J. BRENNER
Commissioner of Patents